United States Patent [19]
Freedman et al.

[11] 3,794,131
[45] Feb. 26, 1974

[54] ALL TERRAIN MOTOR SCOOTER

[75] Inventors: Gerald Freedman, Wilmette; Robert A. Wahls, McHenry, both of Ill.

[73] Assignee: Freedman Seating Company, Evanston, Ill.

[22] Filed: May 20, 1971

[21] Appl. No.: 145,226

[52] U.S. Cl. ............................ 180/5 R, 180/9.24 A
[51] Int. Cl. ........................................... B62m 27/02
[58] Field of Search..... 180/5 R, 9.24 R, 25, 9.24 A

[56] References Cited
UNITED STATES PATENTS

| | | | |
|---|---|---|---|
| 3,404,745 | 10/1968 | Smieja | 180/9.24 R |
| 3,362,492 | 1/1968 | Hansen | 180/5 R |
| 3,336,994 | 1/1968 | Pederson | 180/5 R |
| 3,435,907 | 4/1969 | Imhoff | 180/25 R X |
| 3,650,342 | 3/1972 | Pushing | 180/5 R |
| 3,610,356 | 10/1971 | Byar | 180/5 R |
| 3,592,279 | 5/1969 | Donelson | 180/5 R |

*Primary Examiner*—Richard J. Johnson
*Attorney, Agent, or Firm*—Alter, Weiss, Whitesel & Laff

[57] ABSTRACT

A track chassis supports the center of gravity of the entire vehicle. Pivotally mounted near the back or trailing end of the track chassis is a forwardly extending frame which carries a fork assembly including a pair of either skies or wheels steered by handle bars, which may be quickly replaced by another and similar unit in order to switch between the skis and wheels or oversize low pressure balloon tires. A variable resilient coupling interconnects the front or leading end of the track chassis and the forwardly extending frame. By suitably changing the resilience of the coupling, the front wheels or skis may be made to lift slightly so as not to dig into mud or loose sand, or to bear down and bite into snow.

9 Claims, 9 Drawing Figures

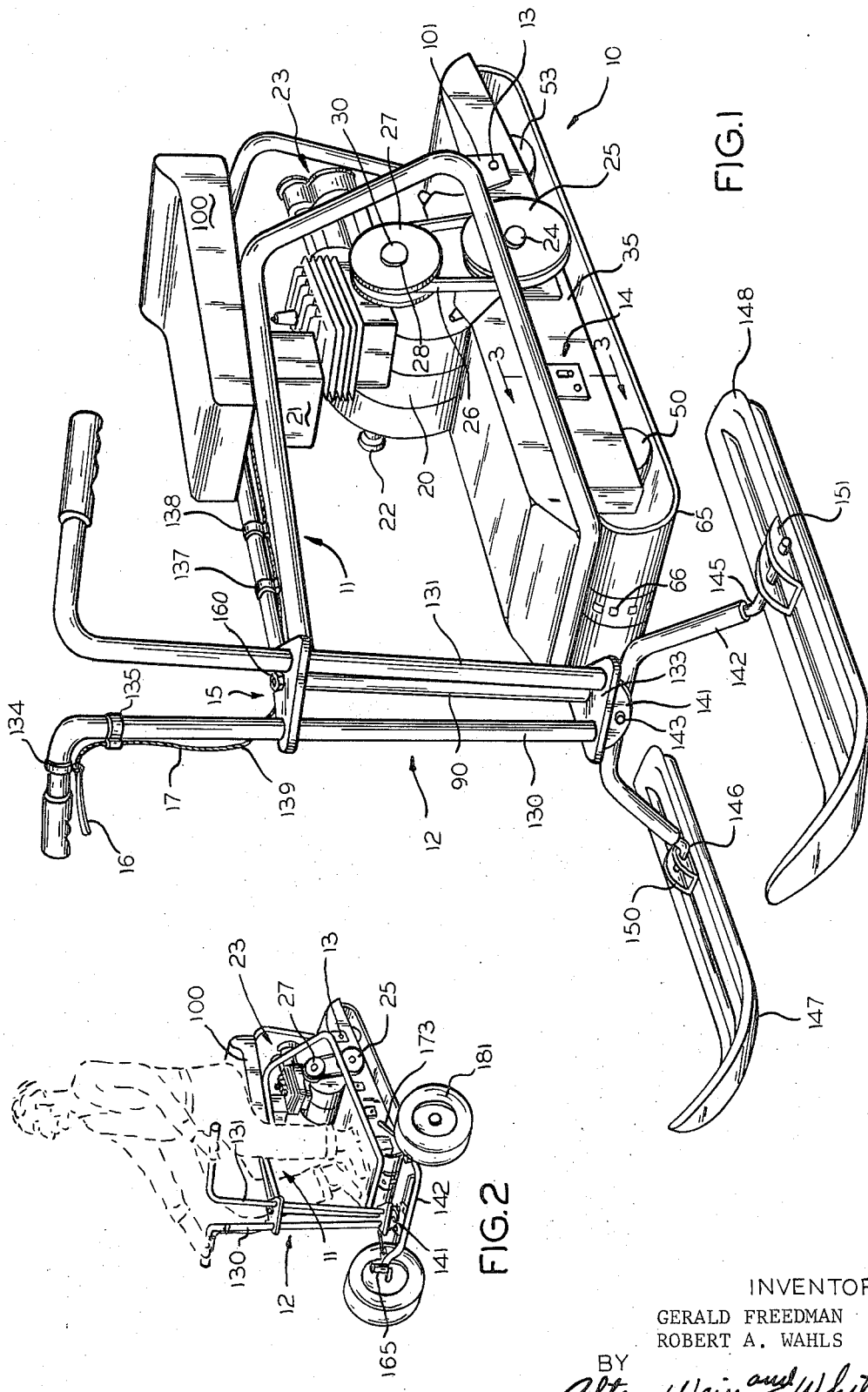

INVENTORS
GERALD FREEDMAN
ROBERT A. WAHLS

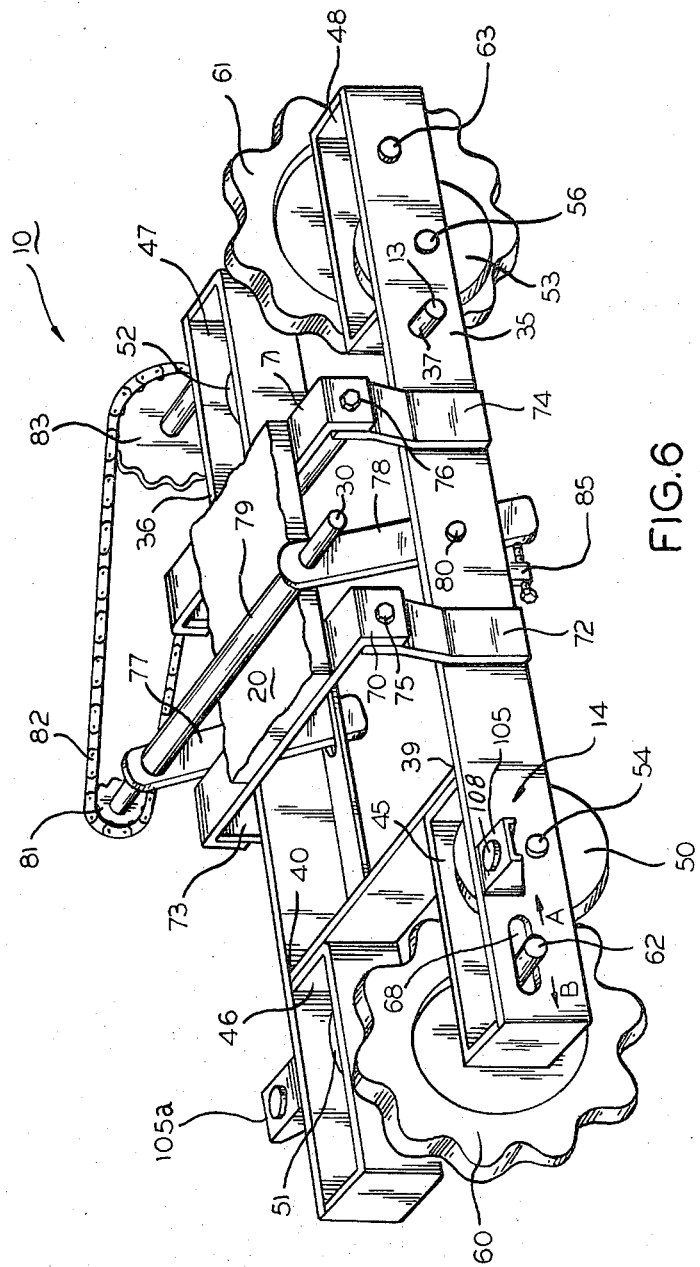

INVENTORS
GERALD FREEDMAN
ROBERT A. WAHLS

BY
Alter, Weiss and Whitesel
ATTORNEYS

ALL TERRAIN MOTOR SCOOTER

This invention relates in general to the "mini-bike" and snowmobile art and more particularly to miniature all terrain vehicles.

In general, an all terrain vehicle is one which is able to travel over snow, ice, land, pavement, sand, mud, and the like. The mini-bike and snowmobile vehicles are often thought of as hobby vehicles for the fun seeker. However, both of these vehicles also have a potential as a utility vehicle. For example, these vehicles have possible use for lawn work, on the farm, in the woods, at the beach, and elsewhere. This is especially true of vehicles which may be quickly and easily converted into a device which is able to carry substantial loads over almost any kind of terrain.

There has been some effort toward the development of these and other similar vehicles; however, the development has tended to move in the direction of greater complexity, greater cost, more specialized and larger vehicles. This movement has created a number of unfilled needs. For example, the resulting vehicles have tended to move toward the class of automobiles and trucks, and to cost too much for handyman use around the home, for low cost fun, and the like. Moreover, as these vehicles have grown larger and more complex, they have required progressively more elaborate trailers or trucks for their transportation. The vehicles have tended toward more limited use, such as exclusively on the snow or land, but not on both.

Accordingly, an object of the invention is to provide new and improved vehicles for all terrain travel. More particularly, an object of the invention is to provide such a vehicle which has multi-uses, such as: for the fun seeking hobbiest, as a small lawn tractor, as a vehicle for light utility or farm hauling, for the hunter or vacationist, and for specialty purposes such as a golf cart, dunes buggy, beach buggy, and the like.

A further object is to provide a completely safe vehicle of the described type which may be used by children or the elderly or may be rented to indifferent users.

Another object is to provide an extremely reliable, very low cost unit which is simple to maintain and use. Here an object is to provide a basic unit which can be quickly and easily adapted to travel over virtually any of many types of terrains.

Still another object is to provide a vehicle of the described type which may be transported in the trunk of a conventional automobile. Here an object is to provide a unit which is light enough to be lifted by one man having normal strength.

Yet another object is to provide an all terrain vehicle which may be manufactured through a use of general purpose tools. In this connection, an object is to provide a vehicle of the described type which may be manufactured without requiring a high initial capital investment, prior to entry into the market place.

In keeping with an aspect of this invention, these and other objects are accomplished by providing a track chassis for supporting the center of gravity of the entire vehicle. Pivotally mounted near the back or trailing end of the track chassis is a forwardly extending frame which carries an an assembly including a pair of skis or wheels, steered by handle bars, which assembly may be quickly replaced by another and similar unit, to switch between skis, wheels, or oversize balloon tires. A variable resilient coupling interconnects the front or leading end of the track chassis and the forwardly extending frame. By suitably changing the resilience of the coupling, the front wheels or skis may be made to lift slightly so as not to dig into mud or loose sand or to bear down more and bite as deeply as desired into snow.

The nature of a preferred embodiment of the invention may be understood best from a study of the attached drawings in connection with the following specification, in which:

FIG. 1 is a perspective view of the inventive all terrain vehicle;

FIG. 2 is a perspective view of a full grown man of average size riding the vehicle, which is here presented to give a scale showing the miniature size of the vehicle;

FIG. 6 is a perspective view of the track chassis, per se, with a motor broken away to show the motor mounts;

Figure 8:
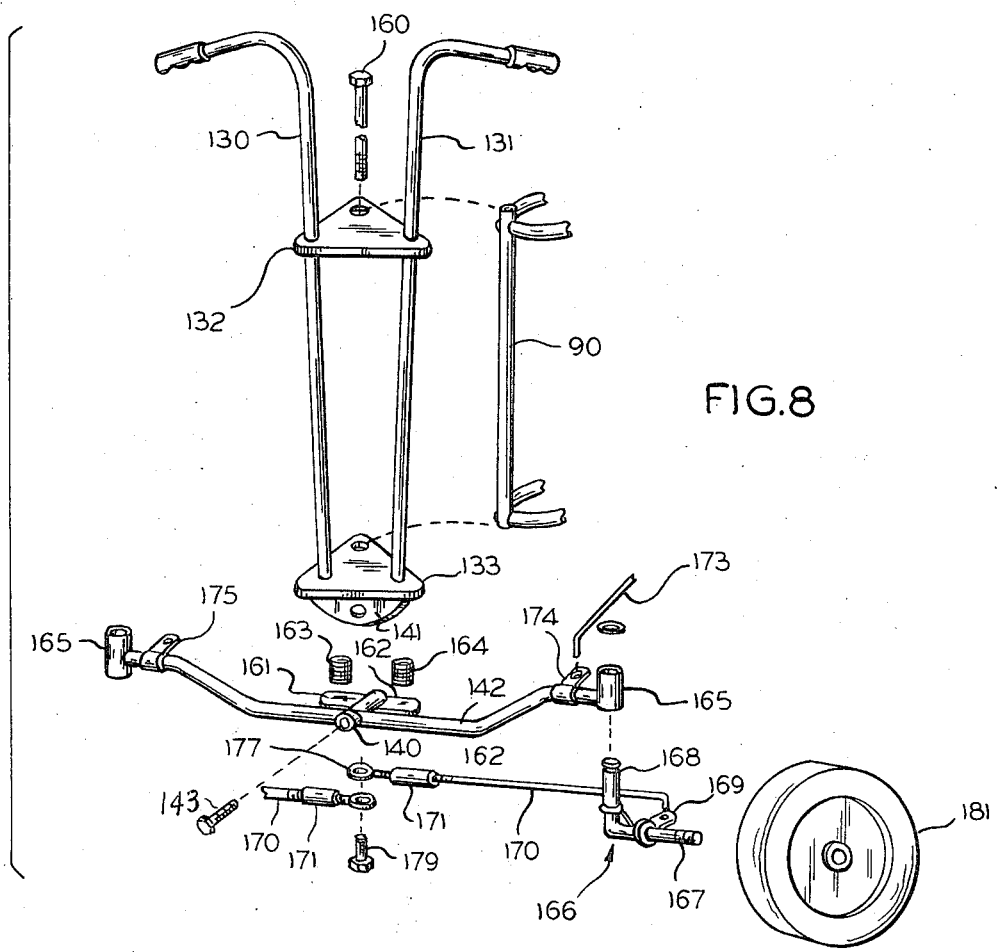

FIG. 7A schematically shows how the forwardly extending frame is resiliently biased to lift slightly with respect to the normal weight on the ground surface bearing the total weight of the track chassis;

FIG. 7B schematically shows how the same frame is resiliently biased to bear down with relatively more weight on the ground surface bearing the total weight of the track chasis; and FIG. 8 is an exploded view of portions of the fork assembly used to convert the vehicle into the land mode of operation.

Figure 4:
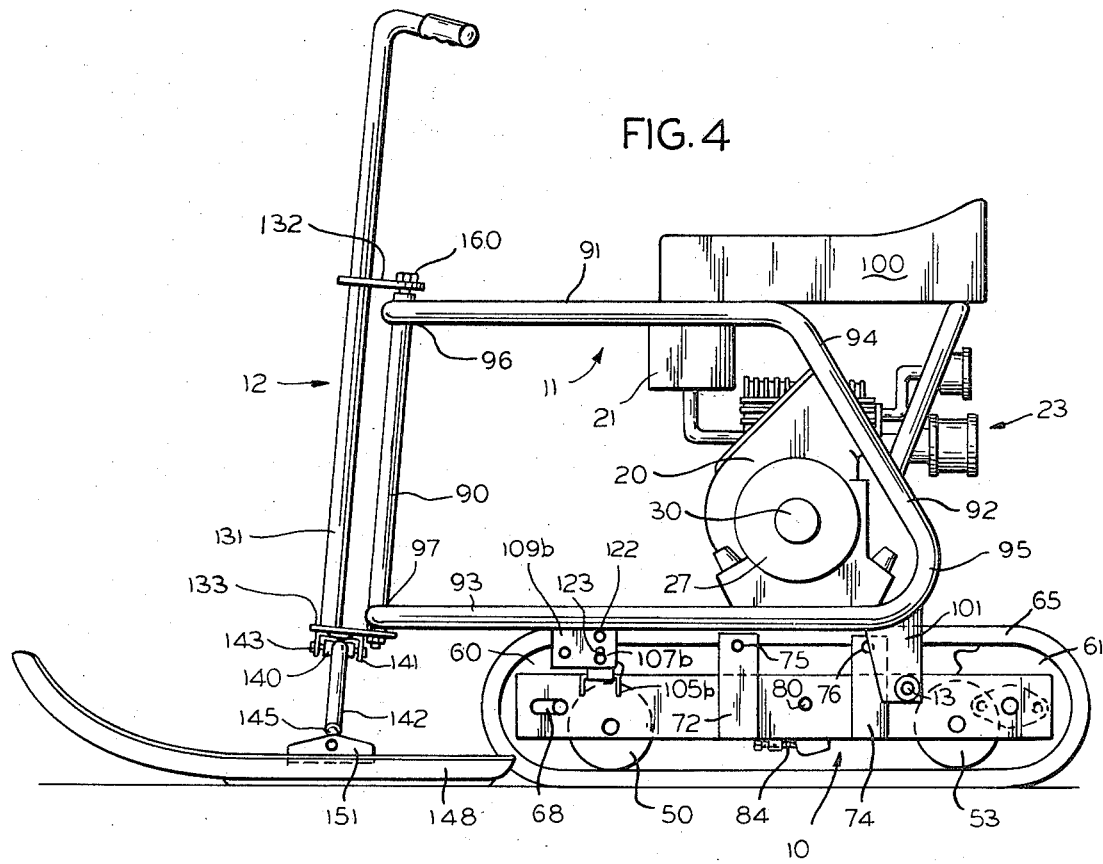
FIG. 4 is a side elevation view of the inventive vehicle.
Figure 5:
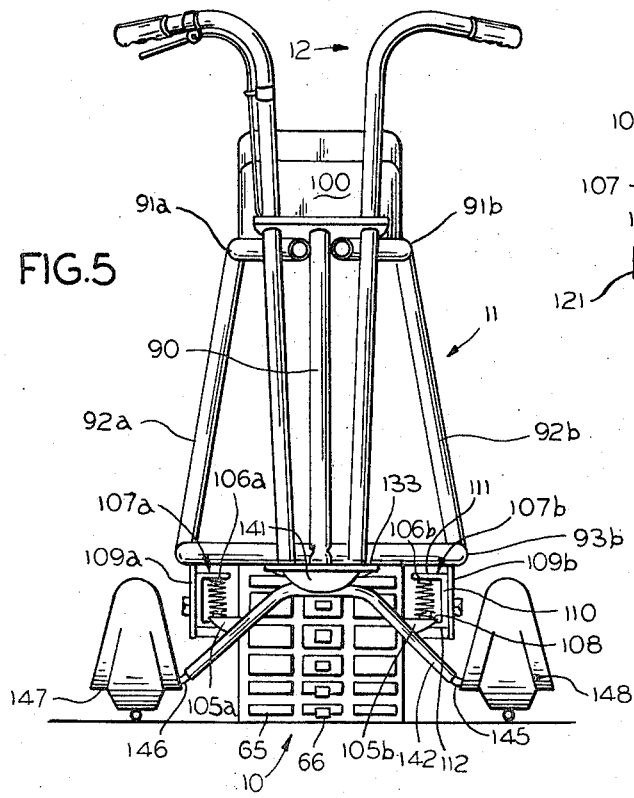
FIG. 5 is a front elevation view of the inventive vehicle.
Figure 3:
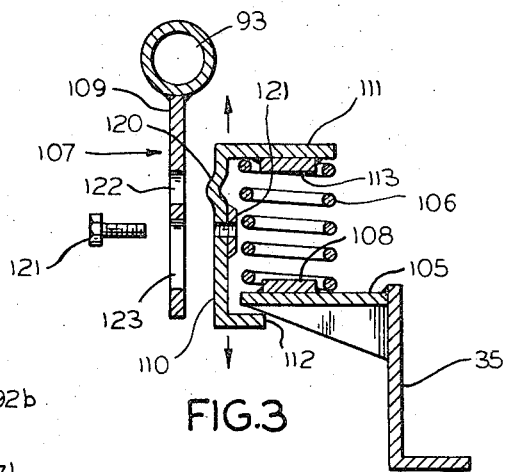
FIG. 3 is a cross-sectional view taken along line 3—3 of FIG. 1, showing the front resilient coupling device for interconnecting the forwardly extending frame and the track chassis, bearing the weight at the center of gravity.

As best seen in FIGS. 1, 4 and 5, the inventive vehicle comprises three major assemblies, a track chassis 10, a forwardly extending frame 11, and a fork assembly 12. The frame 11 is pivotally attached at 13 to the rear or trailing end of the chassis 10, and resiliently attached at 14 to the front or leading end of the track chassis. The fork assembly 12 is attached to the frame 11 by means of a single bolt 15 passing through bearings associated with a tubular frame member. A hand or thumb lever 16 provides for throttle control via a cable 17. Another hand or thumb lever may also be provided to control brakes, if desired. Usually, the compressing of the motor provides adequate braking for small vehicles such as this.

The driving power is developed by a small horsepower motor 20 (such as four to six horsepower, for example). Preferably, motor 20 is bolted directly to the track chassis in a position which gives quick and easy access to gasoline tank 21 and recoil starter 22 while positioning the muffler, exhaust, and air cleaner 23 at the rear of the vehicle. The crank shaft 24 of the motor 20 is connected to a larger pulley 25 from which a drive belt 26 transmits power to a torque converter 27. Of course, any other suitable motor also may be used.

Torque converter 27 comprises two somewhat conical shaped halves pressed together by a coiled spring 28. When the vehicle is traveling at a sustaining speed, the pull on the drive belt 26 is reduced somewhat, whereupon spring 28 pushes the two halves of converter 27 together. Therefore, the drive belt 26 is, in effect, trained over a pulley having a relatively larger circumference, and the associated drive shaft 30 turns at a higher speed. When the vehicle demands more power (as when going uphill), the increased tension in drive belt 26 tends to overcome the resilience of the spring 28. The two halves of the torque converter are forced against the urging of the spring 28. The drive belt is, in effect, trained over a pulley having a relatively smaller circumference. Therefore, for the same throttle adjustment, the drive shaft 30 receives more pulling power, but it tends to turn at a slower speed, as the drive belt tension increses.

The weight of the rider, motor, and frame is primarily positioned over and supported by the track chassis 10. In greater detail, the track chassis 10 may be understood best from a study of FIG. 6. Two angle iron side rails 35, 36 are secured in spaced, parallel relationship by welding cross members, as at 37, 38, 39, 40, for example. The cross member welded at 37, 38 is at the rear or trailing end of the track chassis 10 and provides the pivot point 13 for attaching the frame to the track chassis.

Four box members 45, 46, 47, 48 are welded at the four ends of the two side rails 35, 36. A bogie wheel 50-53 fits into each of the box members 45-48, respectively, where they are rotably secured in place by individually associated axles 54-56. Two large sprocket wheels 60, 61 are secured between box members 45, 46 and 47, 48 by axles 62, 63. Sprocket wheel 61 is a drive sprocket, and sprocket wheel 62 is an idler sprocket. An endless rubber belt 65 (FIGS. 1, 4, and 5), having an endless series of centrally located sprocket holes 66, is trained around the sprocket wheels 60, 61, and the bogie wheels 50-53. At 68, a longitudinal adjustment of the axle of sprocket wheel 60 allows sufficient movement in a retracted direction A, for removal of the endless track 65 and, in an advanced direction B, for the tensioning of the track to an operating condition.

The motor 20 is mounted on two inverted U-shaped brackets 70-71 bolted to four vertical posts (including 72, 73, 74) welded to the side rails 35, 36. If four bolts, such as 75, 76 are removed, the motor 20 may be lifted away to enable replacement of the track 65 which slips on over the sprocket wheels 60, 61, while retracted at 68.

A U-shaped jack axle support member comprising a pair of pivoted arms 77, 78, welded to the ends of a tube 79, is pivotally attached to side rails 35, 36 by two pivot members, such as axle or bushing 80. Shaft 30 passes through tube 79 with suitable bushings or bearings to transmit power from torque converter 27 to a sprocket wheel 81 and a bicycle chain 82 trained over a second sprocket wheel 83, coupled to drive the track drive sprocket 61, and therefore to the associated track 65. A suitable means such as a bolt 85 is attached to either or both of the side rails 35, 36 to push against either or both of the arms 77, 78, and thereby establish their vertical angular positions. In this manner, the tension in the bicycle chain 83 may be adjusted.

The forwardly extending frame 11 may best be understood from a studying of FIGS. 4 and 5. In the side elevation view (FIG. 4), there are two horizontally disposed trapezoidal frames formed by tubular members 90-93 which are bent at 94, 95 and welded at 96, 97. (Similar frame members 90-93 of the two sides are distinguished in FIG. 5 by the suffixes a and b, respectively). When viewed from the front, the frame has an appearance of a truncated triangle. When viewed from the top (not shown) the frame has a generally V-shape, with the apex of the V being welded to the vertical member 90. The frame 11 fits over the motor 20 and carries a seat 100 for supporting the rider.

Means are provided for pivotally mounting the frame member near the trailing end of the track chassis. In greater detail, two oppositely disposed tabs 101 are welded to depend from the lower trailing corner 95 of the frame. These tabs make a pivoted connection to cross member pin 13 at the trailing end of the track chassis 10. Thus, the forward end of the frame (vertical bar 90) may tend to raise or lower with respect to the horizontal position of the track.

Variable resilient coupling means are provided for interconnecting the leading end of the track chassis and the forwardly extending frame. More particularly, welded to the side rails 35, 36 (near the forward or leading ends thereof) are outwardly extending drive frame spring support assemblies 105a, 105b. The upper surface of each of these support assemblies has a boss or locater 108 for fixing the bottom position of a coiled spring 106a, 106b. Welded to the frame members 93a, 93b are two depending tabs 109a, 109b positioned juxtaposed to the supports 105a, 105b, respectively. Inside the tabs 109a, 109b, and firmly bolted thereto, are two spring bracket assemblies 107a, 107b. Each of the brackets 107 has a vertical wall 110 with an upper shelf member 111 and a lower shelf member 112. On the under side of each of the upper shelf members 111 is a locater 113 for fixing the upper end of the coiled springs 106a, 106b. The lower shelf members 112 engage the bottom of support members 105a, 105b to limit the upward travel under the influence of the springs 106a, 106b.

Hence, it is seen that resilient means 106 are provided for supporting the frame 11 on the front or leading end of the track chassis 10.

Means are provided for adjusting the resilience of the front support means. More particularly, the vertical wall 110 of each bracket 107 comprises a vertically aligned dimple 120 and welded-on threaded nut 121. The brackets 109 contain a plurality of vertically aligned apertures here shown as an upper hole 122 over elongated slot 123. The hole 122 is dimensioned and positioned to receive and locate the dimple 120 when the bolt hole in the welded nut 121 is aligned with the upper end of the slot 123. In this position, the spring 106 is allowed to relax somewhat, and there is a greater distance of vertical travel between the frame 11 and track chassis 10. The ride is somewhat softer.

If the bracket 107 is moved downwardly, as viewed in FIG. 4, both the dimple 120 and the bolt hole in the welded nut 121 are captured within the elongated slot 123. This compresses and prestresses the spring 106 to restrict the distance of vertical travel between the frame 11 and the track chassis 10. The ride may be somewhat more firm than it was with the dimple 120 in the hole 122. Thus, in resume, the variable resilient means comprises a bracket 107 having two vertically oriented positions with the coiled spring 106 compressed between the track chassis frame and the bracket. Thus, the spring is prestressed to different degrees depending upon the vertical bracket position.

Figure 7:
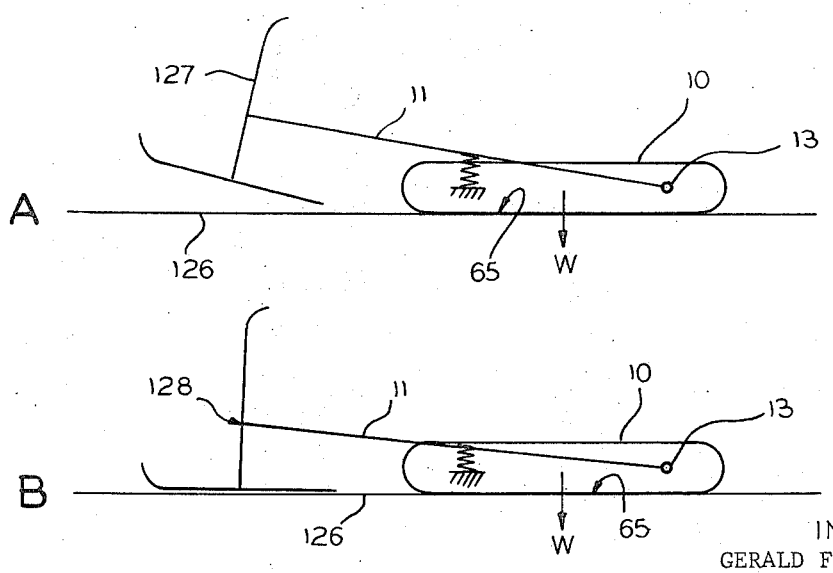

The effect of this adjustment of the resilient support means may be understood from a study of FIG. 7. The center of gravity of the rider, motor, and other elements of substantial weight, is represented by the arrow W. Since this weight depends from approximately the center of the track chassis 10, the bottom of the track 65 always rests firmly on its supporting ground 126. Hence, the effect of greater spring travel (i.e. when the dimple 120 is in hole 122) is to tend to raise the front end (as at 127) of the vehicle. This is shown in FIG. 7A, in greatly exaggerated form, for purposes of explanation. However, when there is less spring travel (i.e. dimple 120 is in slot 123), the front end is lowered, as at 128 (FIG. 7B).

The adjustment of FIG. 7A is ideal for travel over mud or soft sand, for example. The front end 127 of the vehicle rides lightly over the sand and does not dig into it. On the other hand, the adjustment of FIG. 7B is ideal for travel over ice, for example. The front end 128 of the vehicle bites into the ice and tends to keep the vehicle from skidding.

Thus far, the description has proceeded on a basis that a simple two position bracket 107 may be used to adjust the spring tension and frame travel. This adjustment is more than adequate for a vehicle which was actually built and tested, and it has a very low cost. However, it should be understood that other automatic, semi-automatic, or lever controlled plural setting spring adjustments may be provided. The adjustments may be made in discrete increments, or they may be continuous over an entire range. Hence, this means should be broadly construed to include all equivalent structures.

Fork means are provided comprising a pair of either skis or wheels, steered by handlebars, which may be used interchangeably to provide all terrain usage. More particularly, the fork assembly comprises two tubular members 130, 131, bent to have a downwardly extending part and an outwardly and angularly extending part. The downwardly extending parts are joined by upper and lower pivot plates 132, 133 which are welded in locations which are separated by a vertical distance equal to the length of frame member 90. The ends of the outwardly extending members are positioned to form comfortable handlebar grips which may be covered by conventional rubber sleeves. One or more thumb or hand levers 16 (FIG. 1) and associated cables 17 are mounted on the tubular members 130, 131 by quick disconnect clamps 134, 135. The cable 17 is also clamped to frame 11 at 137, 138 with sufficient slack near 139 to enable free and easy steering.

The lower pivot plate 133 includes a generally U-shaped ski or wheel fork mounting bracket 141 having spaced parallel dependent tabs for pivotally receiving a bushing 140 at the center of an inverted fork 142. The pivotal attachment 143 of fork 142 to the bracket 141 enables a predetermined amount of vertical play which is limited by the mechanical contact between fork 142 and plate 133.

Attached to the outer ends of the fork 142 are two angular ski mounting brackets 145, 146. A pair of skis 147, 148 are pivotally secured to these brackets at a pair of upstanding supports 150, 151.

Means are provided for quickly and easily converting the inventive vehicle from a snow to a land vehicle. Briefly, this means provides for interchangeably attaching the fork assembly means 12 to the front bracket 90 of frame 11 whereby the vehicle may be used on all terrain by the simple act of replacing fork 12 by another and similar fork unit in order to switch between skis, wheels, or oversize balloon tires. More particularly, the land or wheel version of the two interchangeable fork assemblies is shown in FIG. 8. Each assembly is secured in place by means of a single bolt 160 passing through upper and lower pivot plates 132, 133, and suitable bearings or bushings associated therewith and with frame member 90. Hence, it is only necessary to remove bolt 160 and the quick disconnected hand lever and cable clamps 134, 135. Then the ski fork assembly 12 (FIG. 1) is lifted away and replaced by the wheel assembly of FIG. 8. Thereafter, the vehicle has spaced wheels in the front and the same track chassis in the back.

In greater detail, the land assembly (FIG. 8) comprising a fork assembly with a pair of wheels mounted on opposite sides of said vehicle, includes piece parts 130, 132 and 133 which are the same piece parts used interchangeably during production of the ski and wheel fork assemblies. A pair of oppositely disposed support brackets 161, 162 have busses or locaters on their upper sides to receive and position coiled springs 163, 164. These springs engage similar supports on the under side of bracket 141. Thus, these springs tend to resiliently support the front wheel mounting bracket 142 and to absorb road shock.

At each of the outer ends of the wheel mounting fork 142 are steering knuckles 165, each of which supports a generally L-shaped member 166 forming a wheel support axle 167 and a king pin member 168. Welded to this member 166 is an outstanding tab 169 for receiving the end of a connecting rod 170. The other end of the connecting rod 170 includes a threaded fitting 171 which may be turned to alter the length of the rod 70 and thereby align the wheels. Other members similar to 166–171 (not shown) are associated with the left steering knuckle 165.

Unlike the ski fork assembly, the land assembly mounting bracket 141 is pivotally associated with the plate 133, and is not welded thereto. For example, the pivot connections might be made between plate 133 and bracket 141 by means of the bolt 160 and bushings (not shown). Therefore, stabilizer rods, such as 173, are connected from brackets 174, 175 to the track chassis 10. This way the front wheel fork 142 is rigidly held so that it cannot turn from a vertical plane which is perpendicular to the major axis of the track chassis. However, eyebolts 177 on the two connector rods 170 may be attached to the independently rotatable plate 133 by any suitable means, such as a bolt 179, for example. This way, the handle bars 130, 131 may be swung to the right or left or pull one connector rod 170 while pushing the other connector rod 170. Each connector rod acts on its associated tab 169 to rotate the member 167 about a vertical axis formed by the kingpin 168 running through the knuckles 165. Thus, the wheels 181 mounted on the horizontal axle members 167 are turned to guide the vehicle.

By a proper adjustment of the forward resilient mount bracket 107 and by use of oversize tires, the vehicle may be adapted to travel over soft terrain, such as mud or loose sand.

Those who are skilled in the art will readily perceive the many advantages and adaptations which may be made in the adaptive structure. Accordingly, the attached claims are to be construed to cover all equivalent structures.

We claim:

1. A miniature tracked vehicle comprising track chassis means for supporting the weight of the vehicle, means comprising a forwardly extending frame member pivotally mounted near the trailing end of the track chassis, fork means comprising a pair of skis or wheels steered by handle bars, adjustable resilience coupling means for interconnecting the leading end of the track chassis and the forwardly extending frame, whereby suitably changing the resilience of the coupling causes the front wheels or skis to lift slightly so as not to dig into soft surfaces such as mud or loose sand or to bear down and bite into other surfaces such as snow, means for removably attaching said fork means to the front of said frame whereby said vehicle may be adapted to use on all terrains by replacing said fork means by another and similar unit in order to switch between skis, wheels, or oversize balloon tires, and means for supporting a motor on said track chassis.

2. The vehicle of claim 1 and automatic torque converter means associated with said motor for applying a variable speed and variable torque to drive a track on said track chassis.

3. The vehicle of claim 2 wherein said torque converter comprises a pulley formed of a pair of somewhat conical shaped halves pressed together by a predetermined resilient force, and drive belt means trained over the pulley formed between said conical halves, whereby said belt in effect travels over a pulley having a variable circumference which is set by the tension in said drive belt as compared to said predetermined resilient force.

4. The vehicle of claim 1 wherein said adjustable resilience coupling means comprises a bracket having at least two vertically oriented positions, and spring means positioned between said frame and bracket, whereby said spring means is prestressed to different degrees depending upon the vertical position of said bracket.

5. The vehicle of claim 4 wherein said bracket comprises a first member having a plurality of vertically aligned apertures and a second member which may be bolted into any of said apertures, and means associated with upper and lower ends of said bracket members for limiting the vertical travel of said frame on said chassis.

6. The vehicle of claim 1 wherein at least one of said fork means comprises a pair of skis mounted on the opposite sides of said vehicle.

7. The vehicle of claim 1 wherein at least one of said fork means comprises a pair of wheels mounted on opposite sides of said vehicle.

8. The vehicle of claim 7 wherein said wheel mounting means comprises at least two knuckles each having a generally L-shaped angular wheel support associated therewith, said support comprising a vertical kingpin and a horizontal axle.

9. A miniature tracked vehicle comprising a track chassis support and drive means, said drive means including motor means supported on said track chassis, steering means comprising a forwardly extending frame member pivotally mounted near the trailing end of the track chassis, adjustable resilience coupling means comprising spring means with the variable compliance for interconnecting the leading end of the track chassis and the forwardly extending frame member whereby suitably changing the resilience of the coupling causes the front wheels or skis to lift slightly so as not to dig into soft surfaces such as mud or loose sand or to bear down and bite into other surfaces such as snow, said adjustable resilient coupling means comprises a bracket having at least two vertically oriented positions, and said spring means being positioned between said frame and said bracket so that said spring means is prestressed to different degrees depending upon the vertical position of said bracket.

* * * * *